Oct. 1, 1940.  L. G. COPEMAN  2,216,511
BIRD FEEDING STATION
Filed April 15, 1938  3 Sheets-Sheet 1
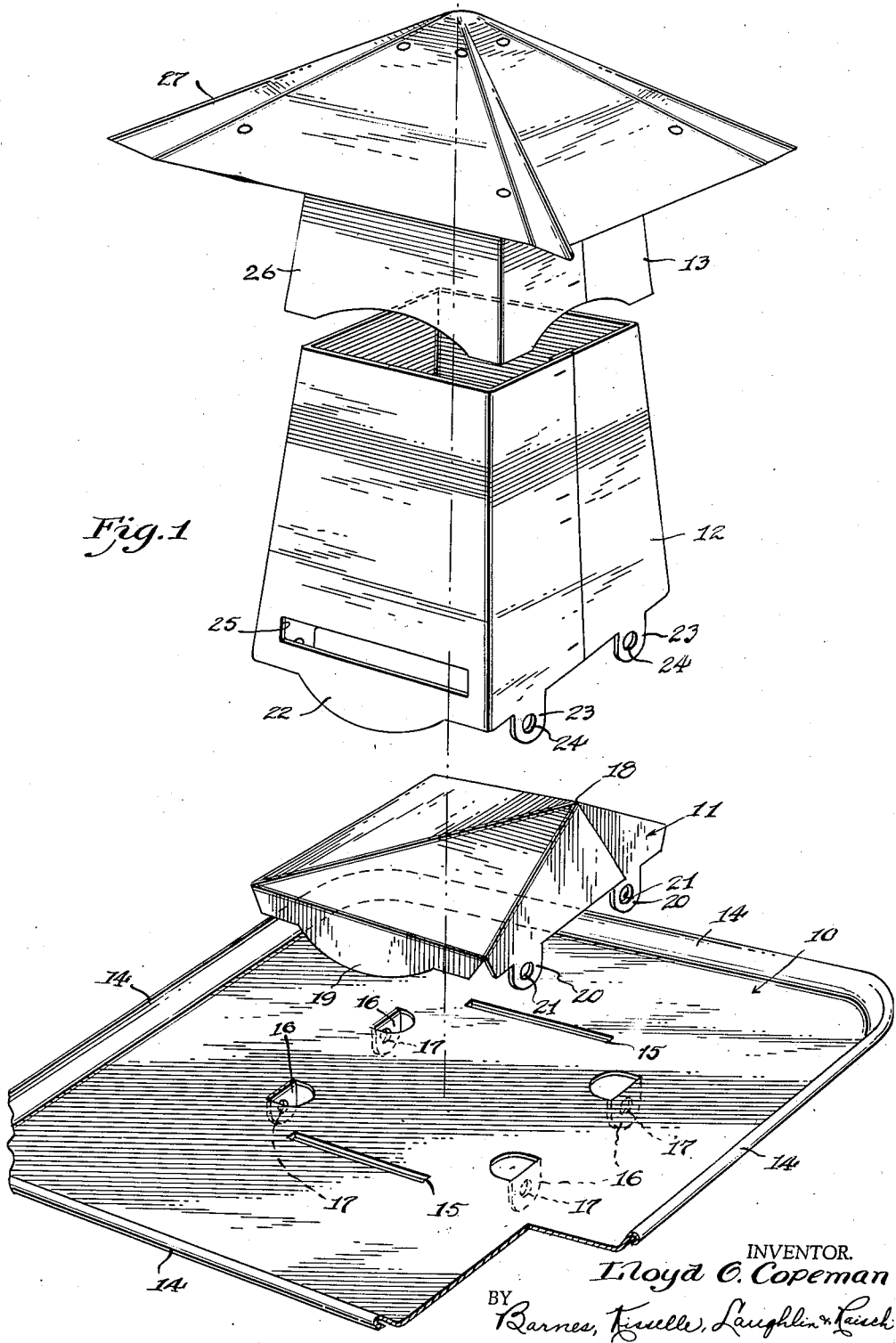
INVENTOR.
Lloyd C. Copeman
BY Barnes, Kisselle, Laughlin & Raisch
ATTORNEYS

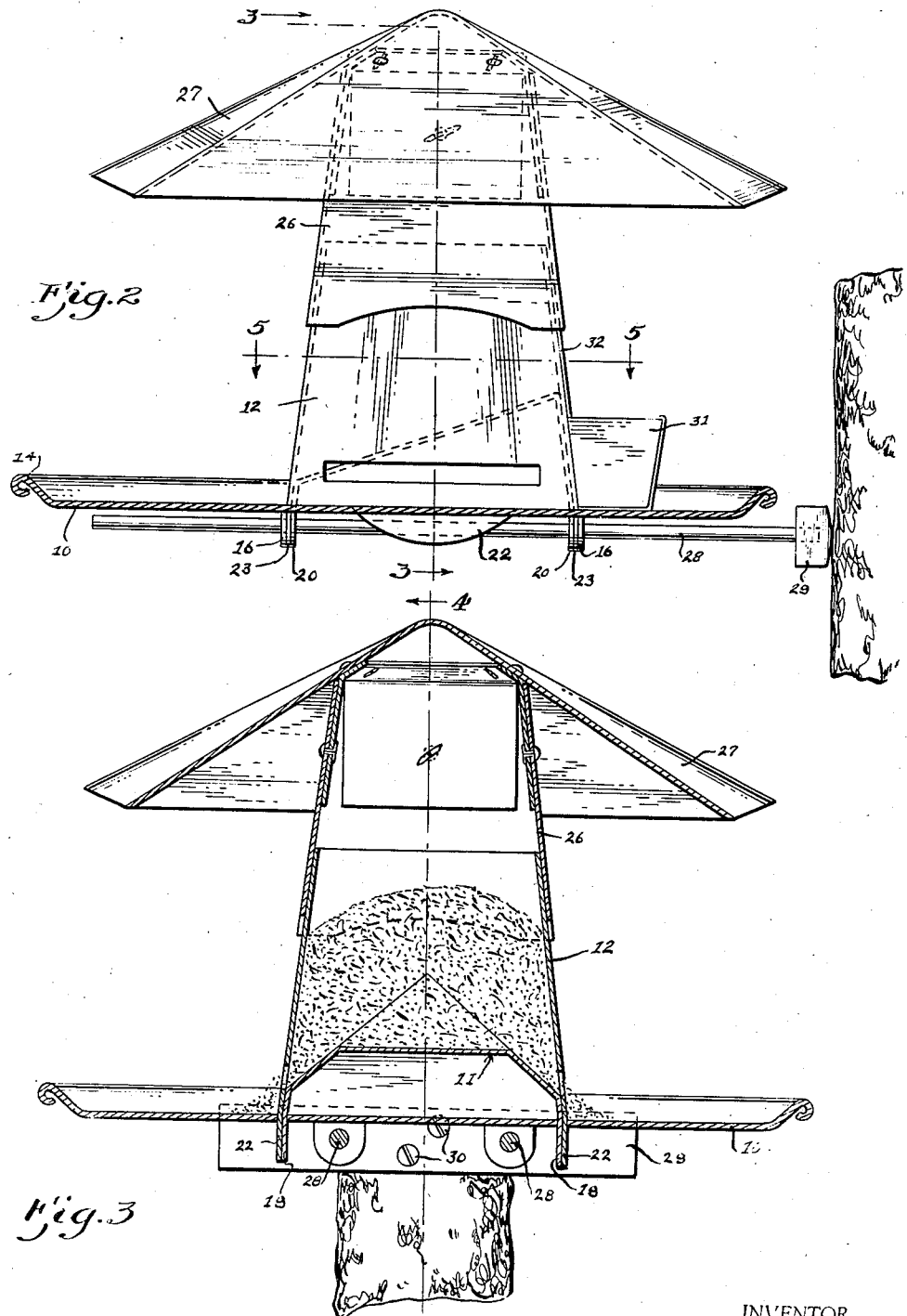

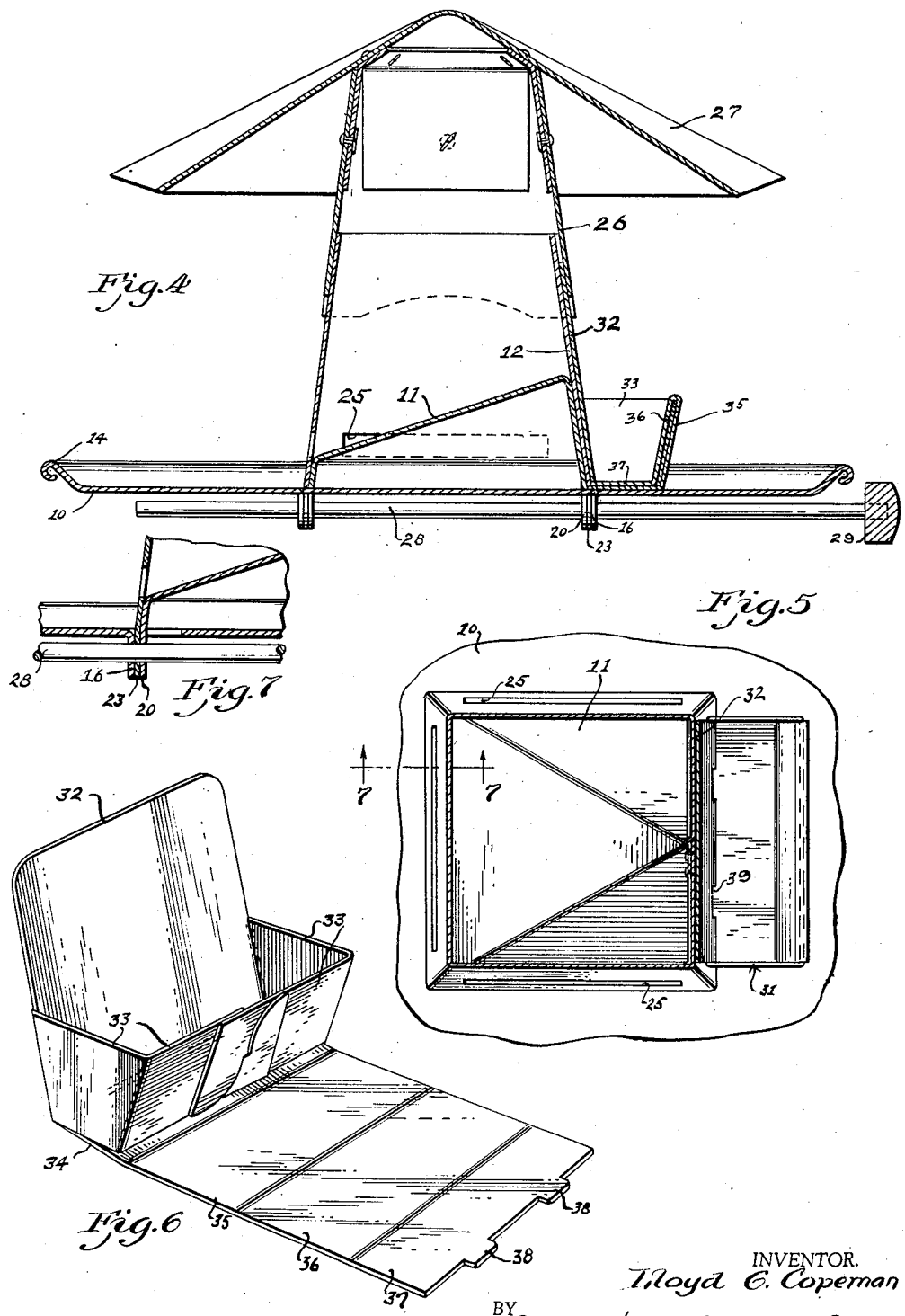

Patented Oct. 1, 1940

2,216,511

UNITED STATES PATENT OFFICE 2,216,511

BIRD FEEDING STATION

Lloyd G. Copeman, Flint, Mich.

Application April 15, 1938, Serial No. 202,160

6 Claims. (Cl. 119—52)

This invention relates to a bird feeding structure.

An object of the present invention is to provide a structure for feeding grain and gravel to wild birds. It has been found undesirable to make grain available to wild life in open containers since in this condition the larger birds and animals, such as squirrels, are apt to scatter the grain out of the containers to the ground where it will be wasted in the wintertime. As a rule, in the wintertime, the smaller birds which are unable to break the crust of snow and ice, are most in need of food. Consequently, a feeding station should be designed to accommodate the smaller birds and to be practically incapable of use by larger birds such as crows, partridges, etc.

An object of the present invention is to provide a bird feeding structure which encloses the grain and feeds it gradually so that it may not be spilled. A further object is to provide a structure which may be easily filled with fresh supplies and which affords considerable protection to birds using the same.

A further object of my invention is to provide a feeding station which may be distributed in knockdown or flat form and easily assembled by the individual users.

An additional feature of my invention lies in the combination with the main feeding structure of a supplementary feeding container for gravel, the latter being essential to the digestion of birds.

Other objects and features of the invention have to do with details of construction and design of the feeding structure and fastening means for the same as will be set forth in the following description and claims. Reference is made to my Patent No. 2,184,633, issued December 26, 1939.

In the drawings:

Fig. 1 is a distended view of the assembly parts of the feeding station showing the shape and relationship thereof.

Fig. 2 is a side elevation view of the assembly of the house.

Fig. 3 is a vertical cross section taken on the lines 3—3 of Fig. 2.

Fig. 4 is a vertical section taken on the lines 4—4 of Fig. 3.

Fig. 5 is a horizontal section taken on the lines 5—5 of Fig. 2.

Fig. 6 is a partial assembly view of the feeder bin showing the details of construction thereof.

Fig. 7 is a partial section taken on the lines 7—7 of Fig. 5.

Referring to Fig. 1, the main elements of the feeder structure consist of a supporting tray 10, a directing means 11, a retaining bin 12 and a cover portion 13.

The feeding tray 10 is formed of a metal or relatively stiff waterproof paper and has sides 14 formed thereon. The tray is provided with opposed parallel slots 15, the purpose of which will later be described. Depending tabs 16 provided with holes 17 are struck out of the tray as shown.

The directing means 11 is formed of a flat piece of waterproof cardboard in such a way that it slants toward the front and toward the two sides from a peak 18. Each side of the directing means is provided with a crescent shaped tab 19 which is to be received by the slots 15 of the tray 10. The back and front of the means 11 have depending tabs 20 provided with holes 21. These tabs are spaced to pass through the holes in the tray 10 formed by the struck out portions 16 and the holes 21 are to register with the holes 17 in the depending tabs 16 of the tray.

The retaining bin 12 is also formed of a single blank of paper and when assembled it takes the shape, as shown in Fig. 1, of a truncated pyramid. As with the directing means 11, the two sides of the bin 12 are provided with elongated tabs 22 and the front and back of the bin are provided with spaced tabs 23 having holes 24. The front and two sides of the retaining bin 12 are provided with horizontal slots 25 which are located so that the lower edges of the slots will coincide with the lower edges of the respective slanting portions of the directing means 11. The top of the feeding structure consists of a side wall assembly 26 adapted to telescope over the retaining bin 12 and pyramidal top construction 27, the details of which are fully described in my copending application, Serial No. 156,443.

The parts of Fig. 1 are shown in assembled relation in Figs. 2, 3 and 4. It will be seen that the tabs 16, 20 and 23 all coincide so that supporting rods 28 may be passed through the holes therein to hold the tabs in assembled relation. The rods 28 form part of a supporting structure which consists of the rods and a horizontal tree bracket 29 which is fastened to a tree by screws 30. When the feeding bin is filled, as shown in Fig. 3, the grain will be fed from the directing means 11 through the feeding slots 25 to the feeding tray 10. With the design as shown, all of the grain will be permitted to flow to the openings as the bin is gradually emptied.

A gravel box 31 as shown in the assembly of Fig. 2, is preferably provided with the feeding structure, and is particularly designed to cooperate therewith. As shown in Fig. 6, the gravel box is formed of a paper blank which consists of a back 32, interlocking end portions 33, a bottom 34, and portions 35, 36 and 37. Referring to Fig. 6, the portions 35 and 36 fold over the front of the interlocking end portions 33 and the portion 37 forms the inside bottom of the gravel box, tabs 38 fitting into slots 39 in the back 32. In assembling the gravel box with the feeding structure, the back 32 is slipped in between the back of the feeding bin 12 and one of the sides of the telescoping portion 26 as shown especially in Fig. 4.

It will be seen that the top 27 overhangs and protects substantially all of the feeding tray 10. With this arrangement larger birds will be kept away from the feeding station so that the smaller birds may feed there with more convenience. If desired, of course, larger feeding stations can be made to accommodate all birds.

What I claim is:

1. In a grain feeding station for birds, a supporting tray, one or more supporting rods, a feed bin on said tray having one or more outlet apertures for bird feed, a base in said bin for directing grain toward said one or more outlet apertures, and apertures formed in said tray, bin and base for receiving said one or more supporting rods whereby said parts are held in assembled position.

2. In a feeding station for birds, a tray member having sides formed thereon, a feed-retaining bin member on said tray having one or more apertures for bird feed, a member in said bin member for directing feed towards said one or more apertures, one or more tab means on each of said members having registering apertures formed therein, one or more supporting rods adapted to pass through said registering apertures in said tabs to hold said members in assembled relation, and means cooperating with said one or more supporting rods to support said feeding station.

3. In a grain feeding station for birds, a supporting tray, one or more supporting rods, a feed bin on said tray having one or more outlet apertures for bird feed, a base in said bin for directing grain toward said one or more outlet apertures, and apertures formed in said tray, bin and base for receiving said one or more supporting rods whereby said parts are held in assembled position, and a removable cover portion for said station overhanging substantially all of said tray.

4. In a grain feeding station for birds, a tray having a plurality of openings therein, a housing structure for feed comprising a base member and body member, the latter having one or more grain outlet openings, portions on each of said members adapted to register with and pass through said openings in said tray, and supporting rod means passing through apertures in said portions whereby the respective parts are maintained in assembled relation, said rod means being disposed below said tray and extending across said tray to a supporting means for the assembly.

5. In a grain feeding station for birds, a supporting tray, one or more supporting rods, a feed bin on said tray having one or more outlet apertures for bird feed, a base in said bin for directing grain toward said one or more outlet apertures, and apertures formed in said tray, bin, and base for receiving said one or more supporting rods whereby said parts are held in assembled position, a removable cover for said station arranged to telescope over said feed bin, and a gravel box comprising a bin portion and a back portion, said back portion being retained between telescoping walls of the cover and feed bin whereby to fasten said box to said bin and tray.

6. In a bird feeding station, a tray member, a four-sided, feed-retaining bin member having horizontal slots in three sides thereof, a four-sided cover for said bin adapted to telescope over the top portion of said bin, a member in said bin for directing feed toward said slots, four apertured depending tab members on each of said members so arranged that apertures of each pair of tabs on each member align with each other and with apertures of two of the tabs on each other member, and supporting rods adapted to pass through said apertures to retain said members in assembled relation.

LLOYD G. COPEMAN.